United States Patent
Baker et al.

(10) Patent No.: US 6,420,974 B1
(45) Date of Patent: Jul. 16, 2002

(54) CONTROL SYSTEM FOR PRESSURE-SENSITIVE PROTECTIVE DEVICES

(75) Inventors: Andrew Dexter Baker, Brockton; Luis Filipe Travassos, Arlington, both of MA (US)

(73) Assignee: Honeywell Data Instruments Inc., Morristown, NJ (US)

(*) Notice: Subject to any disclaimer, the term of this patent is extended or adjusted under 35 U.S.C. 154(b) by 0 days.

(21) Appl. No.: 09/398,574

(22) Filed: Sep. 17, 1999

Related U.S. Application Data
(60) Provisional application No. 60/100,967, filed on Sep. 18, 1998.

(51) Int. Cl.[7] .............................................. G08B 21/00
(52) U.S. Cl. ..................... 340/666; 340/680; 192/129 A
(58) Field of Search ................................ 340/666, 665, 340/680, 679; 192/129 A; 361/189, 160; 307/119, 130

(56) References Cited

U.S. PATENT DOCUMENTS

| | | | | |
|---|---|---|---|---|
| 4,105,899 A | * | 8/1978 | Velosa ........................ | 200/86.5 |
| 4,392,176 A | * | 7/1983 | Kneip et al. ............. | 192/129 A |
| 4,480,738 A | * | 11/1984 | Mattson .................... | 198/346.1 |
| 5,602,428 A | * | 2/1997 | Schultz et al. ............ | 200/86 A |

OTHER PUBLICATIONS

IDEA 1401–A Controller Brochure, Date Unknown (5 pages).
Pinnacle Systems, Inc. STTS Installation Manual, Rev: May 1996. (11 pages).
Scientific Technologies Inc. SMC–1 Series—Din Rail Version, Rev: D, Date Unknown (8 pages).

* cited by examiner

Primary Examiner—Jeffery Hofsass
Assistant Examiner—Sihong Huang
(74) Attorney, Agent, or Firm—Andrew A. Abeyta; Marcus J. Thymian

(57) ABSTRACT

A control for use with pressure-sensitive devices, such as in a machine-guarding application. A plurality of pressure-sensitive devices, such as pressure-sensitive safety mats, are operatively connected to produce a disable signal and a status signal. An activation module produces a switching output responsive to the disable signal and the status signal to disable a machine. In one embodiment the status signal is produced by a comparator in response to a quantity selector and a quantity indication signal produced by the pressure-sensitive devices. In the preferred embodiment, the control system of the present invention is able to detect proper safety mat configuration, whether a threshold pressure is being applied to a pressure-sensing region in the plurality of safety mats, and whether the quantity of operatively coupled safety mats conforms to the quantity specified to be deployed.

22 Claims, 11 Drawing Sheets

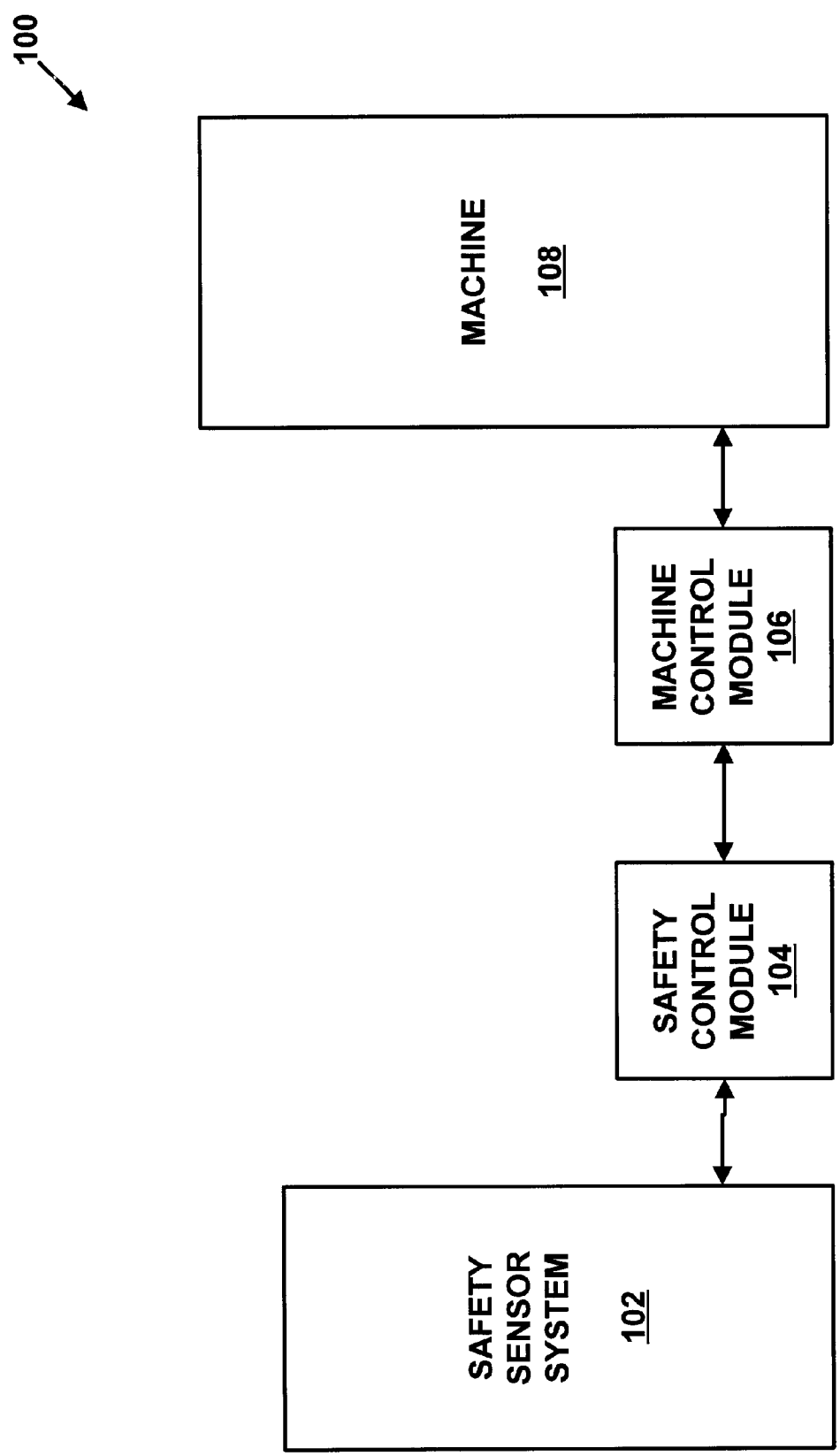

CONTROL SYSTEM FOR PRESSURE-SENSITIVE PROTECTIVE DEVICES

This Application claims the benefit of U.S. Provisional Application No. 60/100,967 filed on Sep. 18, 1998, entitled "Mat Control."

FIELD OF INVENTION

The present invention is related to a safety control system for a machine-guarding application. In particular, the present invention relates to a control system for a safety switching mat configuration.

BACKGROUND OF THE INVENTION

Industry is making increasing use of machines to assist in performing dangerous or repetitious tasks. Many of these machines, or the environments in which they operate, are hazardous to humans because of large moving parts, extreme operating temperatures, dangerous chemicals, and other hazards. Therefore, more attention is being focused toward workplace safety issues, such as systems and methods for guarding machines.

Independent Third Party Standards Organizations, such as the European Machine Directive, Occupational Safety and Health Administration (OSHA), and American National Standards Institute (ANSI) have promulgated standards for machine guarding. As part of these standards, machine safety solutions are often required to be "control reliable." ANSI defines control reliability as "a method of ensuring the integrity performance of control systems, including guards and safeguarding devices that interface with the control system." OSHA similarly requires that "machine controls should be designed and constructed so a failure within the system does not prevent normal stopping action . . . when required, but does prevent initiation of a successive stroke until the failure is corrected."

While progress is being made toward implementing machine safety systems, much of the focus has been on the mechanisms for sensing the presence of objects, such as humans. For example, door sensors, laser-based intrusion sensors, and pressure-sensitive mats are known by those having skill in the machine safety field. However, there exists a need to provide a reliable and flexible control system for interfacing the sensing systems with the machine or machine controller. There also exists a need for a control system that can be used to implement a control reliable machine safety solution.

SUMMARY OF THE INVENTION

In accordance with an illustrative embodiment of the present invention, some of the problems associated with safety in machine environments are addressed.

A control system is provided for use in a machine-guarding application. An exemplary embodiment of the control system includes pressure-sensitive devices producing a disable signal and a quantity indication signal, a quantity selector for setting a specified quantity of pressure-sensitive devices, a comparator for generating a status signal responsive to the quantity selector and the quantity indication signal, and an activation module coupled to the pressure-sensitive devices and the comparator. The activation module is operative to produce an output switching signal that disables power to a machine in response to the disable signal or the status signal.

A second embodiment of a control system for use with a plurality of safety mats in a machine-guarding application includes first and second bias voltages, switches corresponding to the safety mats that produce a disable signal when at least one of the switches is in a closed state; a mat-quantity selector for setting a specified quantity of safety mats, and a mat-quantity comparator producing a status signal responsive to the specified quantity of safety mats differing from an actual quantity of safety mats. An activation module produces an output switching signal responsive to the disable signal or the status signal, to disable power to a machine.

In another aspect, the control system includes a redundant mat-quantity comparator connected to the mat-quantity selector and the safety mats for producing a redundant status signal responsive to the specified quantity of safety mats differing from the actual quantity of safety mats. A redundant activation module then produces a redundant output switching signal responsive to the disable signal or the redundant status signal.

In a third embodiment, a control system for use in a machine-guarding application is provided, having pressure-sensitive safety mats with conductive plates, a quantity selector for setting a total specified impedance, a first window comparator producing a first status signal responsive to a first input voltage being outside a voltage window, a first optical coupler producing a first disable signal responsive to a first threshold current, and a first activation module producing a first output switching signal responsive to the first disable signal and the first status signal.

An alternative exemplary embodiment includes a second window comparator and a second activation module having a second optical coupler.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 1 is a high-level block diagram of an exemplary machine-guarding application;

DETAILED DESCRIPTION OF THE PRESENTLY PREFERRED EMBODIMENTS

Figure 2A:
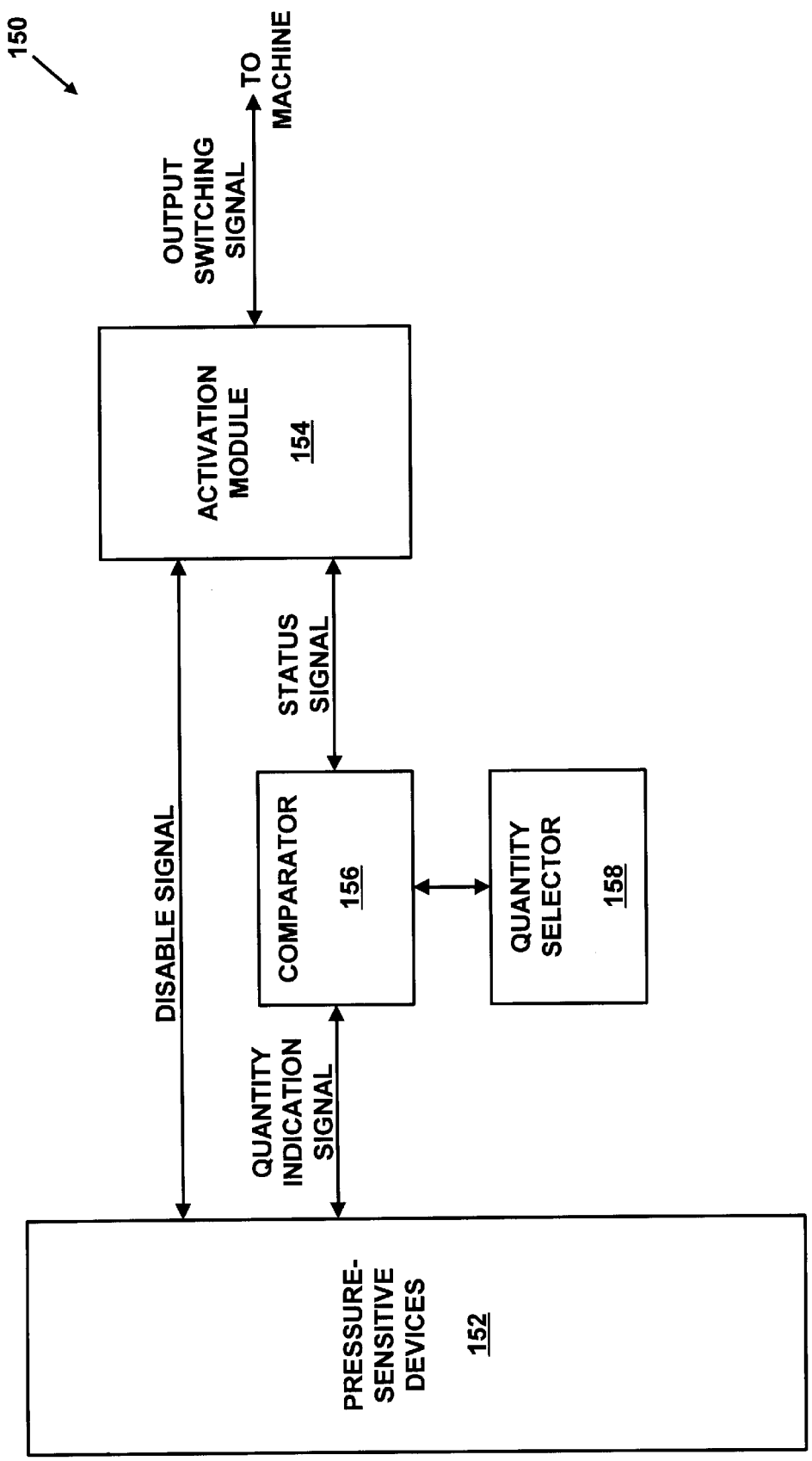
FIG. 2A is a block diagram of a control system for use in a machine-guarding application according to an embodiment of the present invention.

FIG. 1 is a high-level block diagram of a machine-guarding system 100. The machine-guarding system 100 includes a safety sensor system 102 that is monitored and controlled by a safety control module 104 which is coupled to a machine control module 106 for controlling a machine 108. Although the safety sensor system 102, the safety control module 104, the machine control module 106, and the machine 108 are shown as being separate and distinct in FIG. 1, one or more of these may be physically or logically combined in some embodiments. For example, the safety control module 104 may be physically combined in the same proximity as the machine control module 106. Similarly, the machine control module 106 may be part of the machine 108 in some embodiments. Portions of the safety control module 104 may also be incorporated in the safety sensor system 102.

The safety sensor system 102 preferably consists of proximity sensors, such as pressure-sensitive devices or motion sensitive devices, for example. Other proximity sensing systems are known by those having skill in the field of machine safety.

The safety control module 104 receives input from the safety sensor system 102. Such input may include detection of a person or object by the safety sensor system 102, a malfunction in safety sensor system 102, or a misconfiguration in safety sensor system 102, for example. Typically, upon detecting one of these inputs, the safety control module 104 will send a signal to the machine control module 106, stopping operation of the machine 108. For example, the safety control module 104 may cause the machine control module 106 to disable power to the machine 108. As a result, when a person or object goes into a restricted zone covered by the safety sensor system 102, the machine 108 should cease operation.

FIG. 2A is a block diagram of a control system 150 for use in a machine-guarding application. The control system 150 includes a plurality of pressure-sensitive devices operatively connected to produce a disable signal and a quantity indication signal. A comparator 156 is connected to the plurality of pressure-sensitive devices 152 and a quantity selector 158. The comparator generates a status signal responsive to the quantity selector and the quantity indication signal. An activation module 154 is coupled to the plurality of pressure-sensitive devices 152 and the comparator 156, and is operative to produce an output switching signal for disabling power to a machine in response to at least one of the disable signal and the status signal.

Figure 2B:
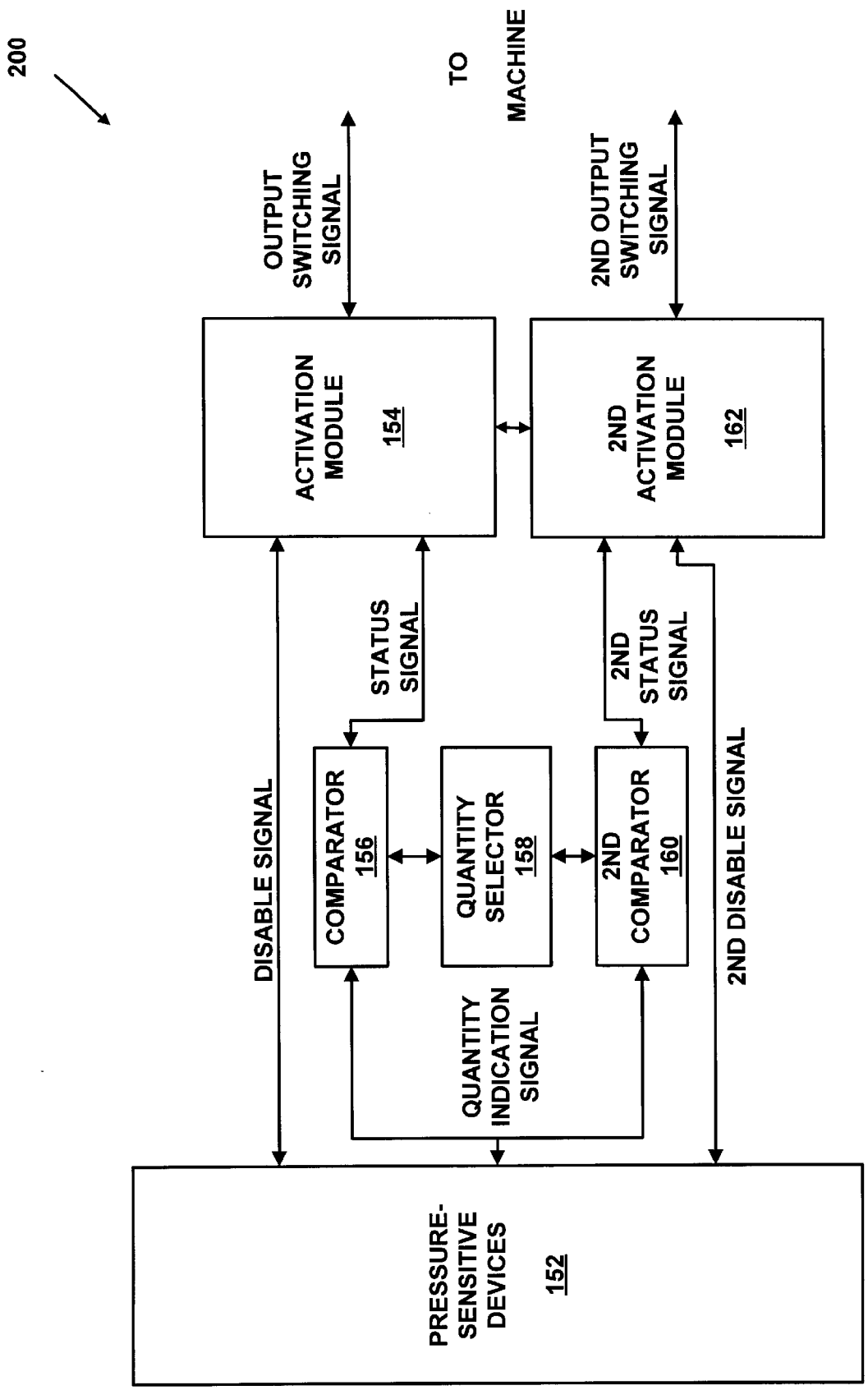
FIG. 2B is a block diagram of a control system for use in a machine-guarding application according to an alternative embodiment of the present invention.

FIG. 2B is a block diagram of a control system 200 according to an alternative embodiment of the present invention. Control system 200 differs from control system 150 in several ways, including the addition of a second (redundant) comparator 160 that produces a second (redundant) status signal responsive to the quantity indication signal and the quantity selector 158. Also included in the control system 200 is a second activation module 162 that produces a second output switching signal responsive to a second disable signal and the second status signal.

Figure 3A:
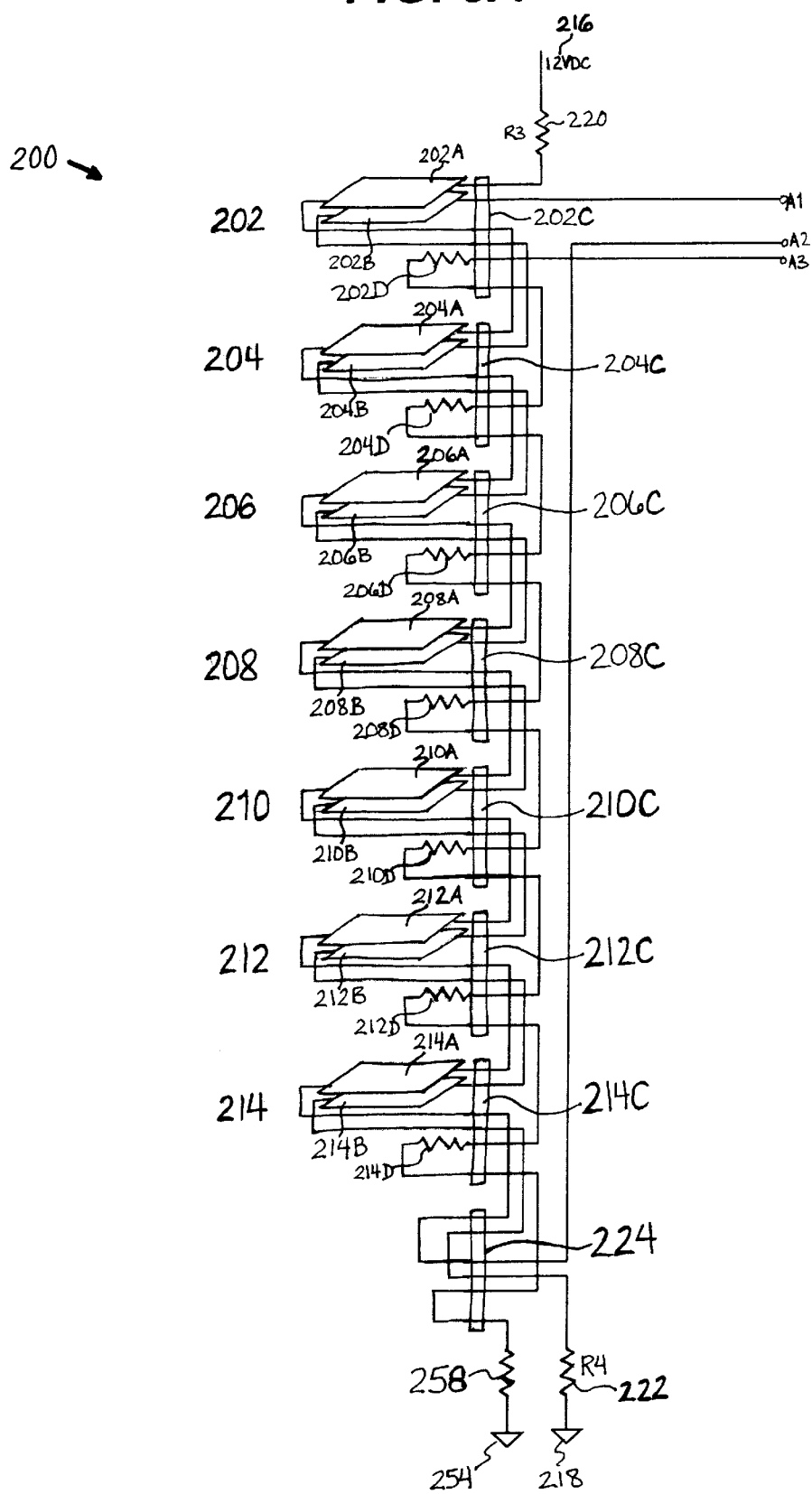
FIGS. 3A, 3B, and 3C show a schematic diagram of a preferred embodiment of a control system for use in a machine-guarding application.
Figure 3B:
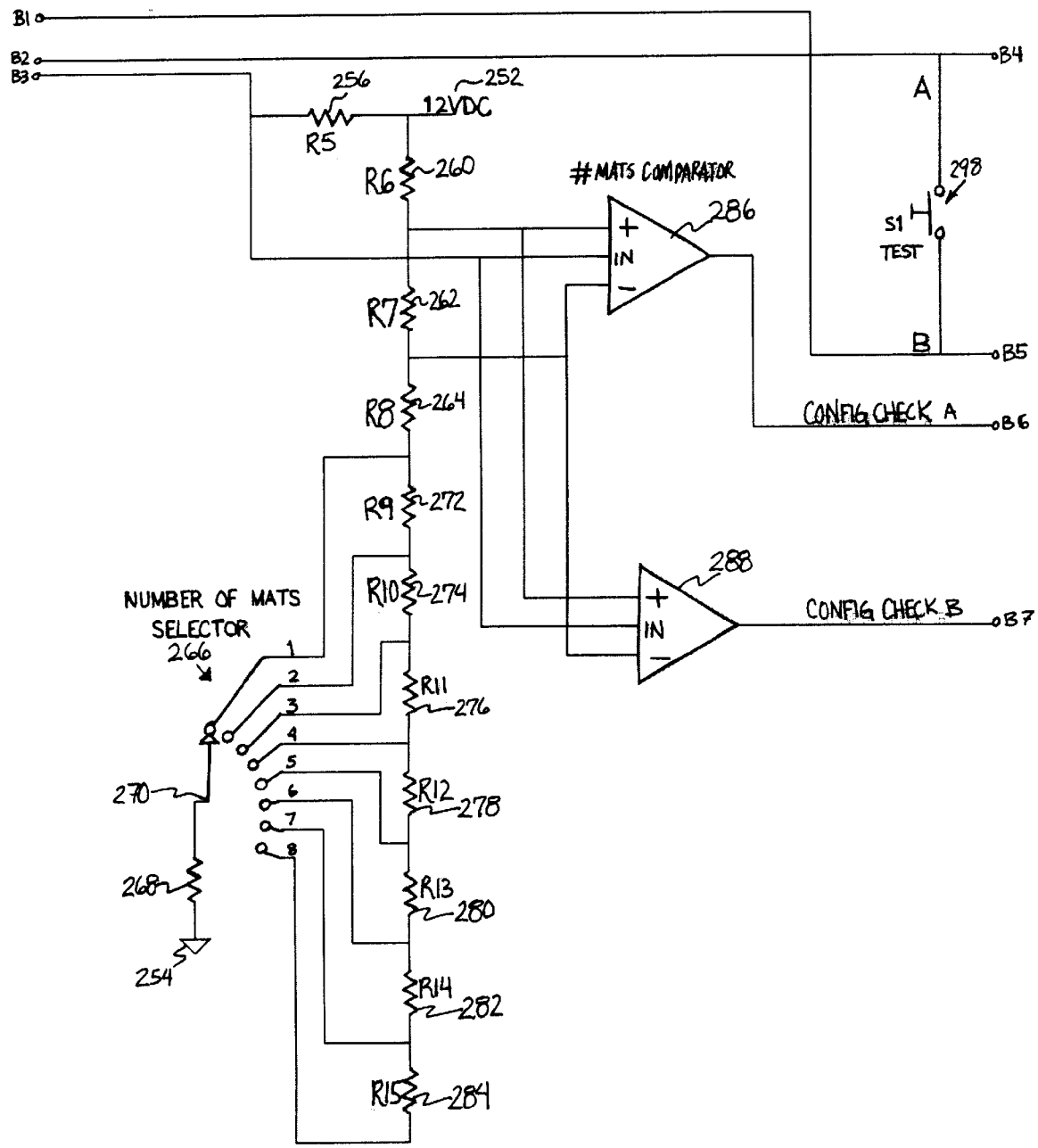
Figure 3C:
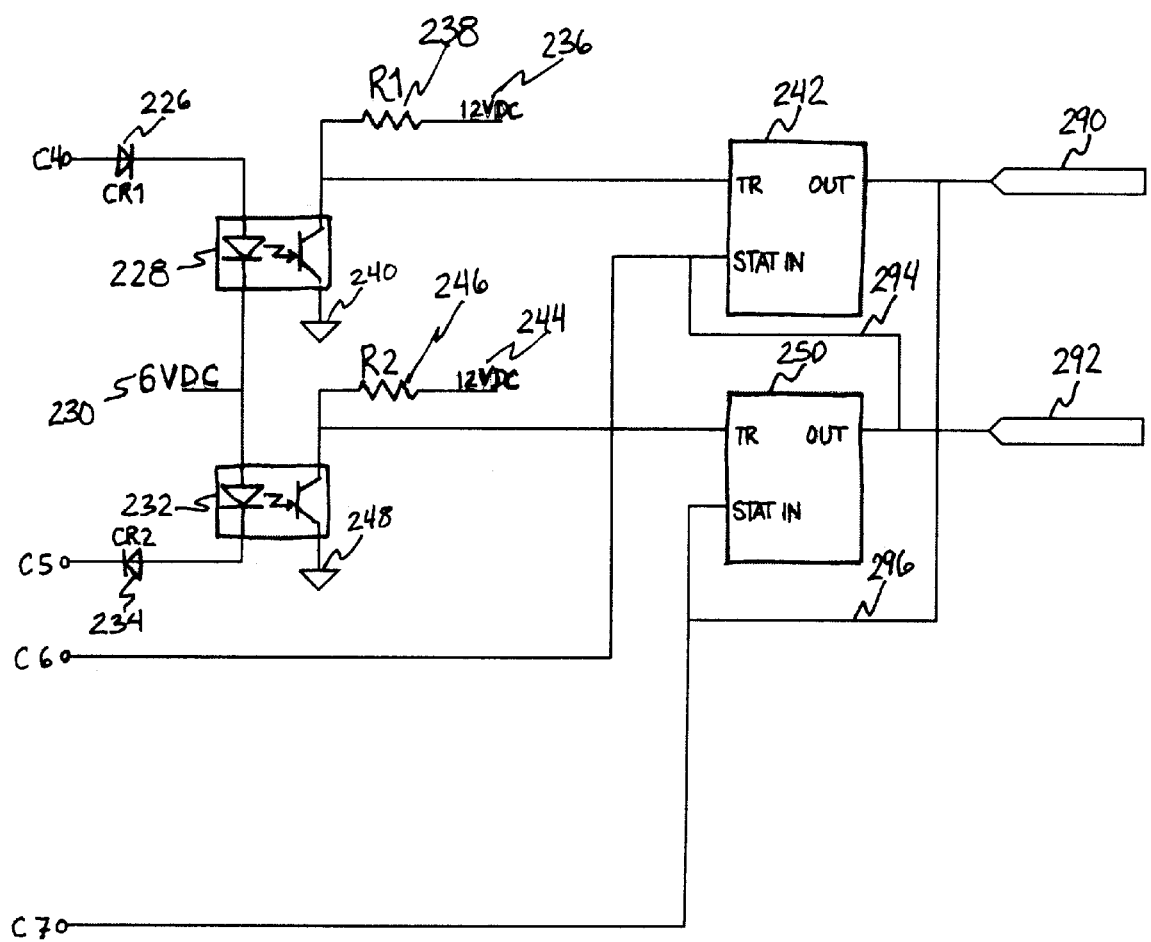

FIGS. 3A, 3B, and 3C show a schematic diagram of a preferred embodiment of the control system 200 for use in a machine-guarding application. Nodes A1, A2, and A3 in FIG. 3A are connected to nodes B1, B2, and B3 in FIG. 3B. Nodes B4, B5, B6, and B7 in FIG. 3B are connected to nodes C4, C5, C6, and C7 in FIG. 3C.

The control system 200 may be implemented in the safety sensor system 102 and the safety control module 104. A plurality of pressure-sensitive devices 202–214 are connected in series between a first voltage source 216 and a second voltage source 218. A resistor R3 220 is connected between the first voltage source 216 and the first pressure-sensitive device 202. A resistor R4 222 is connected between the pressure-sensitive device 214 and the second voltage source 218. The pressure-sensitive devices 202–214 are preferably pressure-sensitive safety mats having first laterally-disposed conductive plates 202A–214A, and second laterally-disposed conductive plates 202B–214B that each define a pressure-sensing region. In the preferred embodiment, each of the pressure-sensitive devices 202–214 are positioned physically adjacent to another pressure-sensitive device, each of the first laterally-disposed conductive plates 202A–214A are in electrical connection with one or more adjacent first laterally-disposed conductive plates, and each of the second laterally-disposed conductive plates 202B–214B are in electrical connection with one or more adjacent second laterally-disposed conductive plates. In addition, the invention could utilize other conductors besides conductive plates. The preferred implementation of the first and second conductors are planar conductive regions, such as the plates described above.

Each instance of the first and second laterally-disposed conductive plates in a pressure-sensitive device defines a switch. The switch has a first (open) state when there is an absence of the threshold pressure, and a second (closed) state when the threshold pressure has been applied. Thus, the plurality of pressure-sensitive devices define a plurality of switches that are connected in parallel. The plurality of first laterally-disposed conductive plates are electrically coupled in series, the plurality of second laterally-disposed conductive plates are connected in series, and the plurality of switches defined by the plurality of first laterally-disposed conductive plates and the plurality of second laterally-disposed conductive plates are thus connected in parallel.

Pressure-sensitive devices 202–214 preferably contain connection mechanisms 202C–214C to provide electrical connectivity between adjacent pressure-sensitive devices. A termination adapter 224 may be employed after the last pressure-sensitive device to provide connection to other portions of the control system 200. Other quantity of termination adapters besides one may be utilized. This may be especially useful when the pressure-sensitive devices are configured in different configurations and quantities to accommodate the shape of the machine and the area to be guarded. A first conductive path is therefore created starting at the first bias voltage 216 going through the resistor R3 220 and the first laterally-disposed conductive plates 202A–214A to the termination adapter 224. A second conductive path is created starting at the first connection mechanism 202C going through the second laterally-disposed conductive plates 202B–214B, the termination adapter 224, and the resistor R4 222 to the second bias voltage 218.

The first conductive path continues to the activation module portion of the controller, through a diode CR1 226 and a first optical coupler 228 to a reference voltage 230. The reference voltage 230 is further connected through a second optical coupler 232 and a diode CR2 234 to the first connection mechanism 202C and the second conduction path. The reference voltage 230 is preferably at an electric potential intermediate between the first bias voltage 216 and the second bias voltage 218. The diode CR1 226 is preferably oriented so that current flows from the termination adapter 224 to the first optical coupler 228. The diode CR2 234 is preferably oriented so that current flows from the second optical coupler 232 to the first connection mechanism 202C. The first optical coupler 228 is preferably oriented so that a current flowing from the diode CR1 226 to the reference voltage 230 causes a light emitting portion (such as a first light-emitting diode) within the first optical coupler 228 to emit light and activate a light detection portion, turning on the first optical coupler 228. The second optical coupler 232 should be oriented so that a current flowing from the reference voltage 230 to the diode CR2 234 causes a light emitting portion (such as a second light-emitting diode) in the second optical coupler 232 to emit light and activate a light detection portion, turning on the second optical coupler 232. The first and second bias voltages 216 and 218, and the reference voltage 230 form a bias circuit connected to the light-emitting diodes, such that when the first disable signal reverse-biases the light-emitting diodes, the disable is further propagated, and power to the machine is disabled. Therefore, when the first optical coupler 228 is turned on, current flows from a fourth voltage source 236 through a resistor R1 238 and the first optical coupler 228 to a fifth voltage source 240.

The bias circuit normally forward biases the first and second light emitting diodes when the switches corresponding to the pressure-sensitive devices are in the first (open) state. When the switches are in the second state, the first and second bias voltages 216 and 218 are changed to substantially the same voltage as the reference voltage 230, thereby reverse-biasing said first and second light emitting diodes. When two optical couplers are utilized, "substantially the same" refers to being within approximately two diode drops.

The state of the first optical coupler 228 being on preferably corresponds to the first disable signal indicating that a threshold pressure has been applied to at least one of the pressure sensing regions. The first disable signal is preferably propagated further through the activation module 154, with the propagated first disable signal taken from the resistor R1 238 and the first optical coupler 228. The propagated first disable signal is supplied to first logic circuitry 242, which is preferably a latching device. Similarly, when the second optical coupler 232 is turned on, current flows from a sixth voltage source 244 through a resistor R2 246 and the second optical coupler 232 to a seventh voltage source 248. The state of the second optical coupler 232 being on preferably corresponds to the second disable signal indicating that the threshold pressure has been applied to at least one of the pressure sensing regions. The second disable signal is preferably propagated further through the activation module 154, with the propagated second disable signal taken from the resistor R2 246 and the second optical coupler 232. The propagated second disable signal is supplied to second logic circuitry 250, which is preferably a latching device. A test switch 298 provides a means for testing the activation module circuitry by simulating a condition in which the threshold pressure has been applied to the pressure-sensing region.

Also included within the control system 200 are means for determining whether the quantity of properly deployed pressure-sensitive devices is in conformance with the quantity of pressure-sensitive devices specified in the overall machine-guarding application. An impedance bridge arrangement is preferably used to make the comparison between the actual quantity of pressure-sensitive devices and the specified quantity of pressure-sensitive devices. The impedance bridge preferably includes an impedance bridge differential voltage consisting of a first impedance bridge voltage source 252 at a higher electrical potential than a second impedance bridge voltage source 254. Resistors are used for impedance in the preferred embodiment. A resistor R5 256 is connected between the first impedance bridge voltage source 252 and a series connection of resistors 202D–214D associated with the pressure-sensitive devices 202–214. The resistors 202D–214D are preferably integrated within the connection mechanisms 202C–214C. The second impedance bridge voltage source 254 is preferably connected through a resistor 258 and the termination adapter 224 to the last resistor 214D in the series connection of resistors 202D–214D. The termination adapter may be bypassed in an alternative embodiment. A second portion of the impedance bridge includes the first impedance bridge voltage source 252 in series connection with a resistor R6 260, a resistor R7 262, a resistor R8 264, a quantity selector 266, a quantity selector resistor 268, and the second impedance bridge voltage source 254. The quantity selector 266 further comprises a selector switch 270 for specifying the quantity of pressure-sensitive devices to be deployed in the machine-guarding application. In the preferred embodiment, the quantity selector 266 adds impedance between the resistor R8 264 and the quantity selector resistor 268. Resistors R9 272, R10 274, R11 276, R12 278, R13 280, R11 282, and R15 284 may be selectively added to the series impedance in the second portion of the impedance bridge. The resistors 272–284 preferably have the same value of resistance as the resistors 202D–214D for proper impedance bridge balancing.

A comparator system preferably contains a first window comparator 286 and a second window comparator 288. The first and second window comparators are preferably identical to one another, and have as inputs a comparator first input taken from between R6 260 and R7 262, a comparator second input taken from between R7 262 and R8 264, and a measured input taken from between R5 256 and the resistor 202D associated with the first pressure-sensitive device 202. The first window comparator 286 provides to the first logic circuitry 242 a first status signal corresponding to whether the measured voltage is within a voltage window defined by the comparator first input and the comparator second input to the first window comparator. Similarly, the second window comparator 288 provides to the second logic circuitry 250 a second status signal corresponding to whether the measured voltage is within the voltage window.

The first activation module preferably includes the first optical coupler 228, resistor R1 238, the fourth voltage source 236, the fifth voltage source 240, the first logic circuitry 242, and a first output 290. The second activation module preferably includes the second optical coupler 232, resistor R2 246, the sixth voltage source 244, the seventh voltage source 248, the second logic circuitry 242, and a second output 292. The first logic circuitry 242 and the second logic circuitry 250 are preferably implemented with logic circuitry, including first and second latches, and first and second timing modules, to control power to the machine 108 based on the inputs received. In a preferred embodiment, the first activation module will send an output switching signal that causes power to be disabled to the machine 108 if the first disable signal is at a logic high or if the status signal is at a logic low. Similarly, the second activation module will cause power to be disabled to the machine 108 if the second disable signal is at a logic high and the second status signal is at a logic low level. If either of the first activation module or the second activation module provides a disable signal to the machine 108 or a machine control module 106, power should be disabled to the machine 108. The first activation module and the second activation module provide the first and second output switching signals, respectively, at the first and second outputs 290 and 292. A first cross-check line 294 provides the first status signal to the second output 292 associated with the second activation module. A second cross-check line 296 provides the second status signal to the first output 290. The first cross-check line 294 and the second cross-check line 296 assist in providing redundancy and cross-checking functionality. For example, if after detecting a threshold pressure upon the pressure-sensing region, the first logic circuitry 242 clears the first output 290 (to eventually re-enable the machine) by changing the value of the first switching signal, the cleared output should be received at the status signal input of the second logic circuitry 250, to cause the second logic circuitry 250 to clear its output. If the second logic circuitry 250 fails to deliver a cleared output within a predefined time period, a malfunction may have occurred, and the machine can be disabled and an alarm initiated, for example. Table 1 shows preferred component values for the control system 200.

TABLE 1

| COMPONENT | | VALUE | |
|---|---|---|---|
| R1 | 238 | 4.7 | k$\Omega$ |
| R2 | 246 | 4.7 | k$\Omega$ |
| R3 | 220 | 200 | $\Omega$ |
| R4 | 222 | 200 | $\Omega$ |
| R5 | 256 | 4.87 | k$\Omega$ |
| R6 | 260 | 4.99 | $\Omega$ |
| R7 | 262 | 402 | $\Omega$ |
| R8 | 264 | 499 | $\Omega$ |
| R9 | 272 | 499 | $\Omega$ |
| R10 | 274 | 499 | $\Omega$ |
| R11 | 276 | 499 | $\Omega$ |
| R12 | 278 | 499 | $\Omega$ |
| R13 | 280 | 499 | $\Omega$ |
| R14 | 282 | 499 | $\Omega$ |
| R15 | 284 | 499 | $\Omega$ |
| RS | 268 | 402 | $\Omega$ |
| RP1 | 202D | 499 | $\Omega$ |
| RP2 | 204D | 499 | $\Omega$ |
| RP3 | 206D | 499 | $\Omega$ |
| RP4 | 208D | 499 | $\Omega$ |
| RP5 | 210D | 499 | $\Omega$ |
| RP6 | 212D | 499 | $\Omega$ |
| RP7 | 214D | 499 | $\Omega$ |
| V1 | 216 | 12 | VDC |
| V2 | 218 | GND | VDC |
| V3 | 230 | 6 | VDC |
| V4 | 236 | 12 | VDC |
| V5 | 240 | GND | VDC |
| V6 | 244 | 12 | VDC |
| V7 | 248 | GND | VDC |
| VB1 | 252 | 12 | VDC |
| VB2 | 254 | GND | VDC |

The control system 200 is merely exemplary. Changes may be made without departing from the intended invention. For example, although seven pressure-sensitive devices were described in the control system 200, the quantity is not limited in that respect. Although the pressure-sensitive devices are shown as mats, other schemes may also be used. Similarly, although series connections were used for various configurations in the control system 200, parallel configurations may also be implemented, and vice versa. The preferred values for various components within the control system 200 are exemplary only, and other values may also be used.

The pressure-sensitive devices in the control system 200 were described as being based on conductance and resistance. Other pressure-sensing schemes may also be used in implementing the control system 200. For example, each of the pressure-sensitive devices could include a compressible bellows containing air or another gas, and a pressure sensor for detecting an increase in pressure when pressure is applied to the bellows.

The resistor arrangement in the plurality of pressure-sensitive devices could be replaced by an alternative quantity determination system. For example, a frequency-dividing flip-flop arrangement could be used to change the frequency of an input signal in response to application of the threshold pressure to the pressure-sensitive devices, and a frequency counter could be used to determine whether a frequency change has occurred, indicating application of the threshold pressure to the pressure-sensing region.

Figure 4:
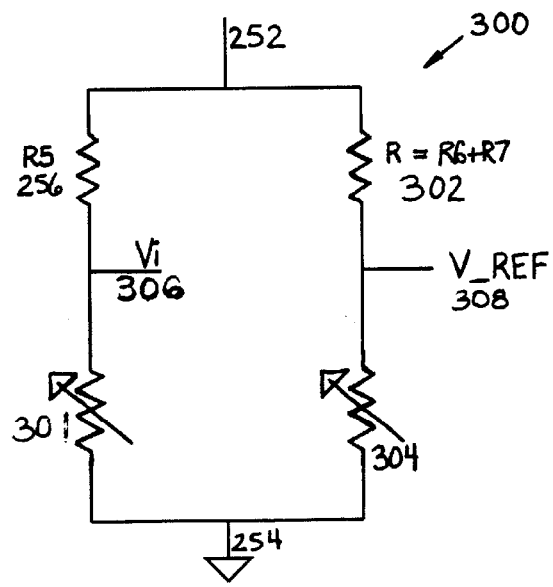
FIG. 4 is a schematic diagram showing an equivalent front-end circuit for detecting a proper configuration of pressure-sensitive devices.

FIG. 4 is a schematic diagram showing an equivalent front-end circuit 300 for detecting a proper configuration of pressure-sensitive devices. The equivalent front-end circuit 300 illustrates the impedance bridge utilized in the preferred embodiment of the present invention. In a first impedance bridge leg is a resistor R5 256 and an equivalent resistance 301 indicating the number of pressure-sensitive devices connected in the machine-guarding application. In a second impedance bridge leg is a resistance 302 made up of resistor R6 260 and R7 262, and an equivalent resistance 304 indicating the number of pressure-sensitive devices that are specified to be connected by the quantity selector 266. The first impedance bridge voltage source 252 and the second impedance bridge voltage source 254 result in an input voltage $V_i$ 306 and a reference voltage V_REF 308. The input voltage $V_i$ 306 and the reference voltage V_REF 308 are used as inputs to the comparator 286.

Figure 5:
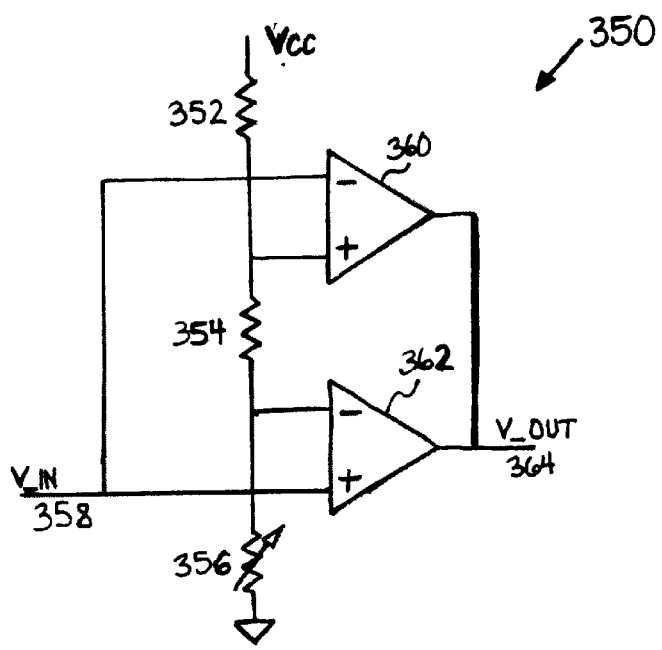
FIG. 5 is a schematic diagram showing a window comparator according to a preferred embodiment of a control system.

FIG. 5 is a schematic diagram showing a preferred embodiment of the window comparator, such as window comparator 286. The window comparator 350 includes a first comparator resistor 352, a second comparator resistor 354, and a third variable comparator resistance 356.

The third variable comparator resistance 356 is preferably set by the quantity selector 266. The second comparator resistor 354 is preferably R7 262, and the first comparator resistor 352 is preferably R6 260. An input voltage 358 is supplied to a negative input of a first comparator 360 and a positive input of a second comparator 362.

A positive input to the first comparator 360 is taken from between the first comparator resistor 352 and a second comparator resistor 354. The negative input to second comparator 362 is taken from between the second comparator resistor 354 and the third comparator resistance 356. The first comparator 360 and second comparator 362 define a comparator window, and produce a status output 364 indicating whether the input voltage 358 is within the comparator window.

Figure 6:
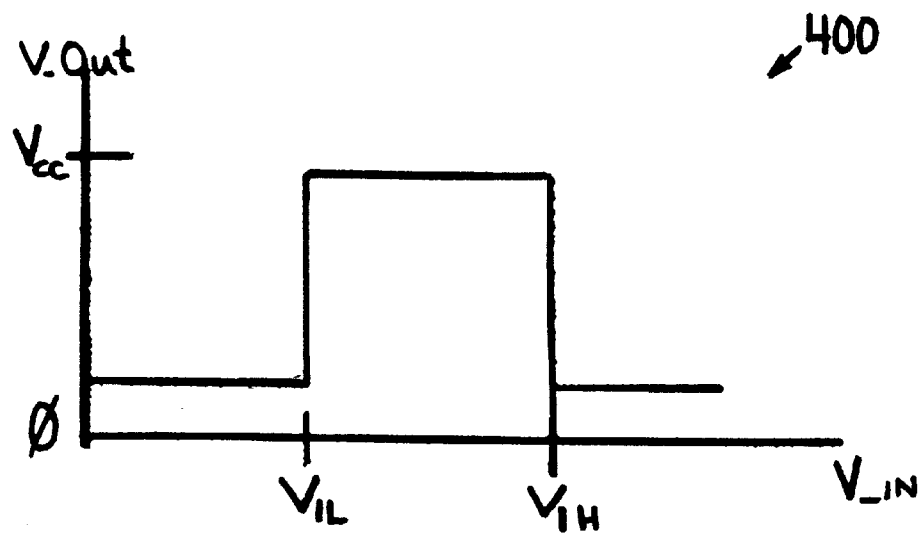
FIG. 6 is a graph showing an approximation of a voltage window produced by a window comparator according to a preferred embodiment of the present invention.

FIG. 6 is a graph 400 showing an approximation of the voltage window produced by the first comparator 360 and the second comparator 362. The graph 400 represents the output voltage 364 as a function of the input voltage 358. When the input voltage is within the comparator window, the output voltage has a value approaching a first window comparator source voltage $V_{cc}$. When the input voltage 358 is outside the comparator window, the output voltage 364 approaches ground. The lower bound $V_{IL}$ of the comparator window is represented by the following equation:

$$V_{IL} = V_{cc} \frac{R3}{R1 + R2 + R3}$$

where R1 is the value of the first comparator resistor 352, R2 is the value of the second comparator resistor 354, and R3 is the value of the third comparator resistance 356. The upper bound $V_{IH}$ of the comparator window is represented by the following equation:

$$V_{IH} = V_{cc} \frac{R2 + R3}{R1 + R2 + R3}$$

where R1, R2, and R3 have resistance values as specified above.

Figure 7:
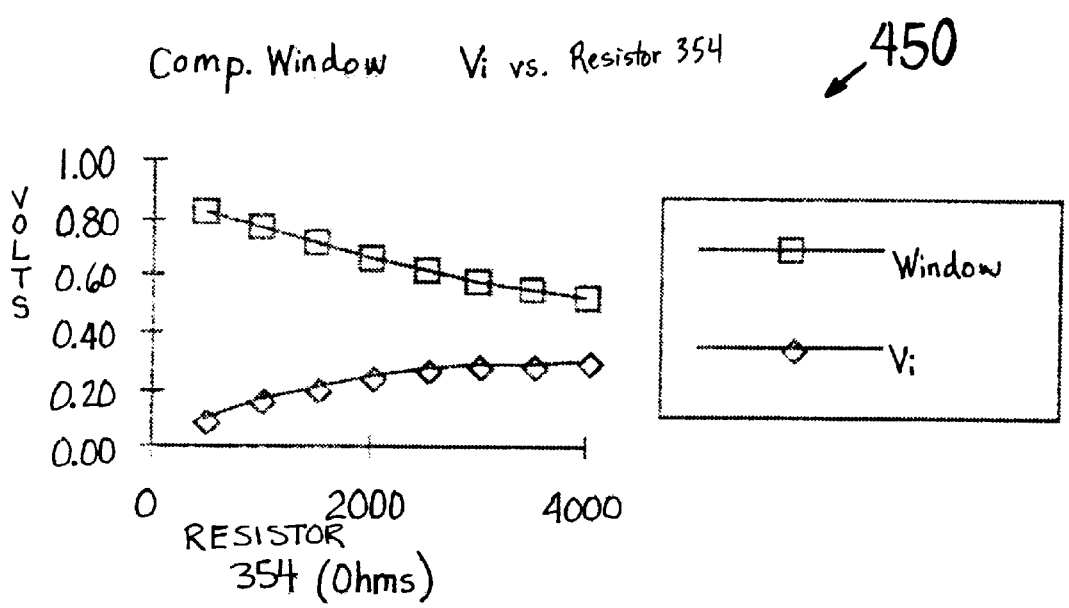
FIG. 7 is a graph showing comparator window size as the value of an associated comparator resistor is changed.

FIG. 7 is a graph showing the width (in Volts) of the comparator window as the value of the second comparator resistor 354 is changed. The width of the voltage window corresponds to $V_{IH}$-$V_{IL}$. The voltage window decreases in size as the value of the second comparator resistor 354 increases in magnitude, generating a larger voltage drop across the second comparator resistor 354. Also shown is the effect of the second comparator resistor 354 on the input voltage 358.

Figure 8A:
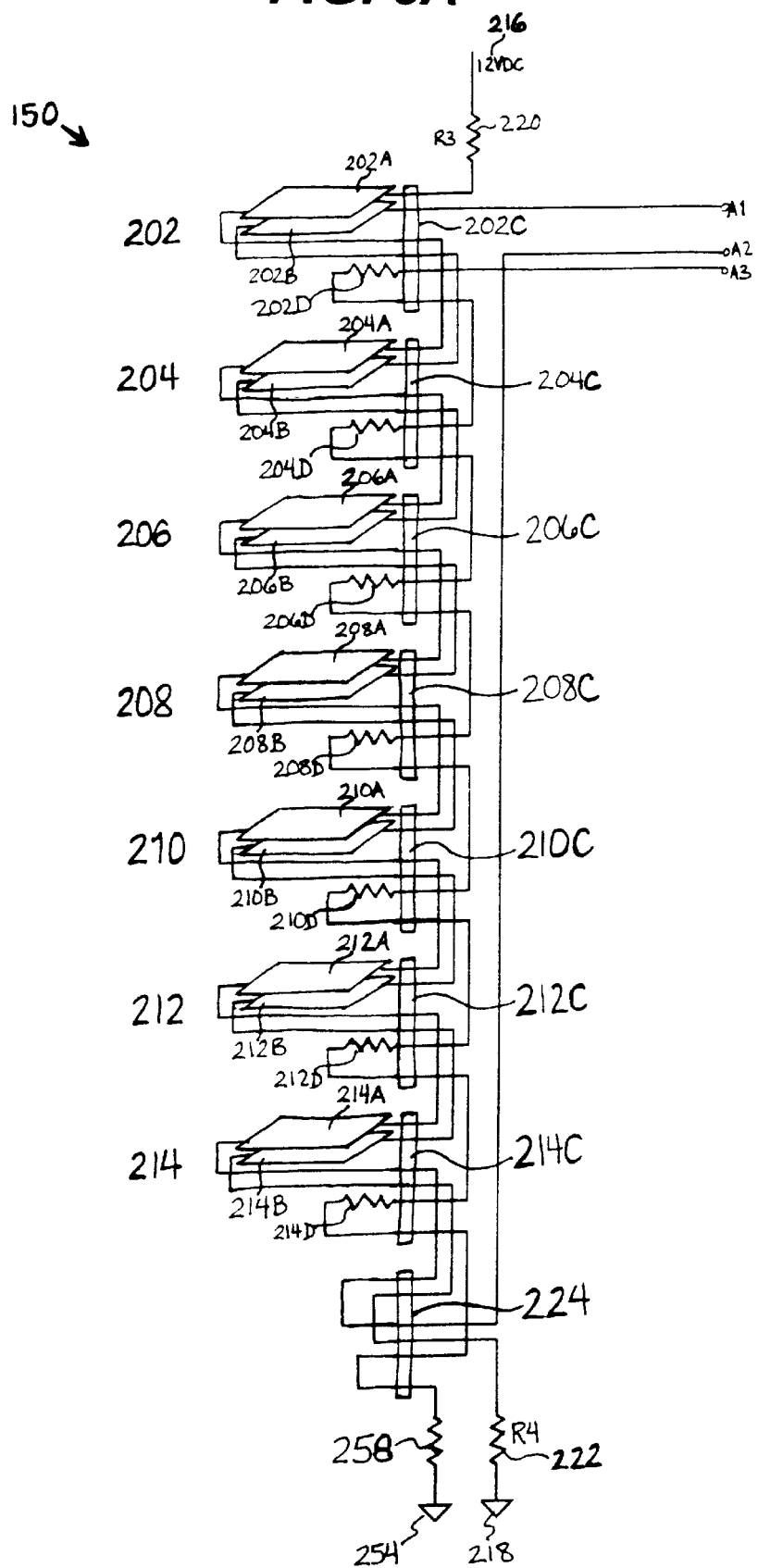
FIGS. 8A, 8B, and 8C show a schematic diagram of an alternative embodiment of a control system for use in a machine-guarding application.
Figure 8B:
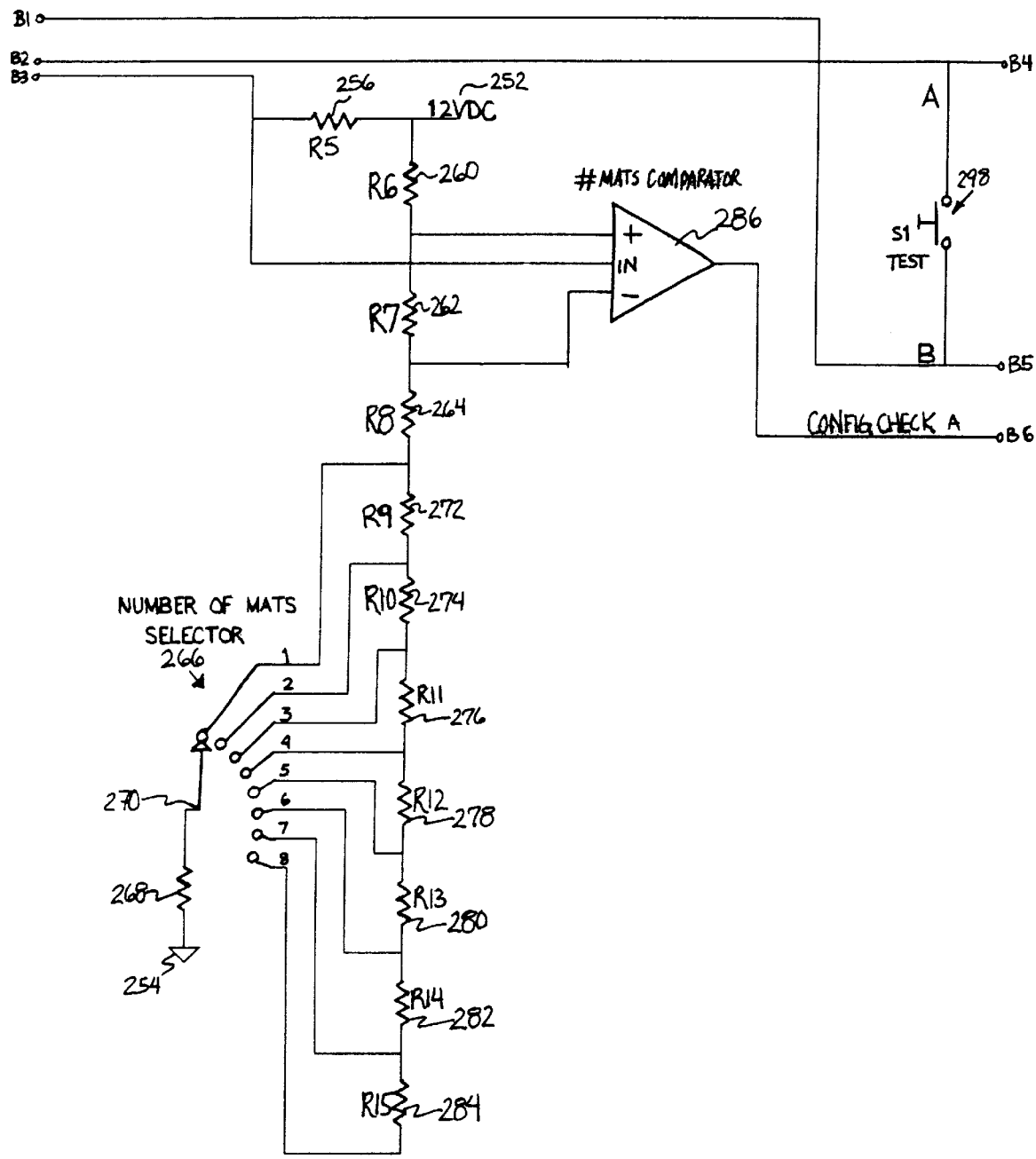
Figure 8C:
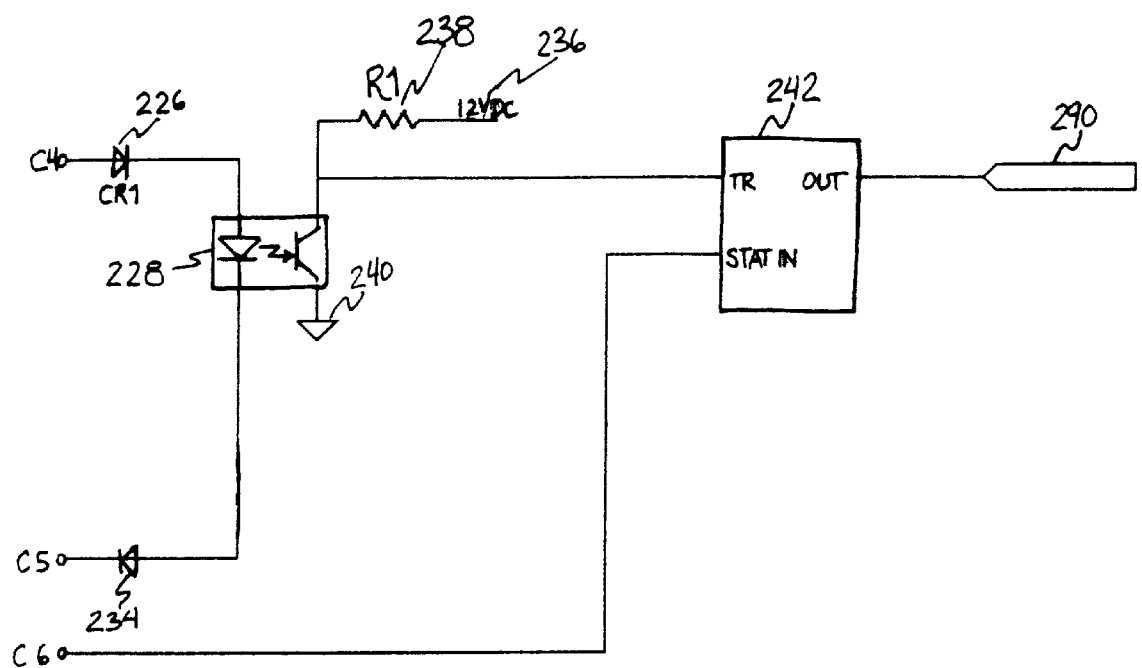

FIG. 8A, 8B, and 8C show a schematic diagram of one embodiment of the control system, 150. Nodes A1, A2, and A3 in FIG. 8A are connected to nodes B1, B2, and B3 in FIG. 8B. Nodes B4, B5, and B6 in FIG. 8B are connected to nodes C4, CS, and C6 in FIG. 8C.

The control system 150 is similar to the control system 200, but does not include all of the redundancies included in the control system 200. The second comparator 328 and the second activation module have been removed. The second activation module, which is redundant and serves to improve reliability, preferably includes the second optical coupler 232, resistor R2 246, the sixth voltage source 244, the seventh voltage source 248, the second logic circuitry 242, and the second output 290. In this alternative embodiment, the bias circuit for the first optical coupler 228 has been modified by removing the connection between the first optical coupler 228 and the reference voltage 230 and replacing the connection with a connection between the first optical coupler 228 and a replacement bias source, such as the second bias voltage 218. The light-emitting diode within the second optical coupler is then reversed biased when the disable signal is received at the second optical coupler. The connection to the second bias voltage 218 is preferably made through the second conductive path through the plurality of pressure-sensitive devices 202–214.

In view of the wide variety of embodiments to which the principles of the invention can be applied, it should be understood that the illustrated embodiments are exemplary only, and should not be taken as limiting the scope of the present invention. For example, more or fewer elements or components may be used in the block diagrams. In addition, the present invention can be practiced with hardware or a combination of software and hardware.

We claim:

1. A control system for use in a machine-guarding application comprising, in combination:
   a plurality of pressure-sensitive devices operatively connected to produce a disable signal and a quantity indication signal, said disable signal indicating application of a threshold pressure to at least one of said pressure-sensitive devices, said quantity indication signal being proportional to an actual quantity of operatively connected pressure-sensitive devices;
   a quantity selector for setting a specified quantity of pressure-sensitive devices;
   a comparator for generating a status signal responsive to said quantity selector and said quantity indication signal; and
   an activation module coupled to said plurality of pressure-sensitive devices and said comparator, operative to produce an output switching signal for disabling power to a machine in response to at least one of said disable signal and said status signal.

2. The control system of claim 1, wherein each of said plurality of pressure-sensitive devices comprises a safety mat having a pressure-sensing region, said safety mat including first and second laterally-disposed conductors, wherein said first and second conductors are in electrical contact when said threshold pressure is applied.

3. The control system of claim 2, wherein said first and second conductors are planar conductive regions.

4. The control system of claim 1, wherein said activation module further comprises:
   an optical coupler having a light emitting diode connected to said plurality of pressure-sensitive devices; and
   a bias circuit connected to said light emitting diode, wherein said disable signal reverse-biases said light emitting diode, thereby disabling power to said machine.

5. The control system of claim 1, wherein said plurality of pressure-sensitive devices comprises a plurality of switches, and wherein said disable signal is generated by any one of said plurality of switches.

6. The control system of claim 1, wherein said activation module further comprises:
   first and second light emitting diodes connected in series to said plurality of pressure-sensitive devices; and
   a bias circuit connected to said first and second light emitting diodes, wherein said bias circuit includes a supply voltage and two resistors connected to said series-connected first and second light emitting diodes, and wherein said plurality of pressure-sensitive devices comprises a plurality of switches connected across said series-connected first and second light emitting diodes, so as to reverse-bias said first and second light emitting diodes upon application of the threshold pressure to any one of said plurality of pressure-sensitive devices.

7. The control system of claim 1, wherein said pressure-sensitive device is a switch having a first state and a second state, said activation module further comprising:
   a reference voltage;
   first and second light emitting diodes connected to said reference voltage; and
   a bias circuit comprising a first bias voltage connected to said first light emitting diode and a second bias voltage connected to said second light emitting diode, for forward biasing said first and second light emitting diodes when said switch is in said first state, wherein said switch being in said second state changes said first and second bias voltages to substantially the same voltage as the reference voltage, thereby reverse-biasing said first and second light emitting diodes.

8. The control system of claim 4, wherein said activation module further comprises a latch connected to said optical coupler, said optical coupler propagating said first disable signal to said latch.

9. The control system of claim 1, wherein said comparator is a window comparator.

10. The control system of claim 1, further comprising:
    a redundant comparator responsive to said quantity selector and said quantity indication signal; and
    a redundant activation module coupled to said redundant comparator and producing a redundant output switching signal.

11. A control system for use with a plurality of safety mats in a machine-guarding application comprising, in combination:

first and second bias voltages, said second bias voltage at a higher electrical potential than said first bias voltage;

a plurality of switches connected in parallel corresponding to said plurality of safety mats, each of said plurality of switches having an open state and a closed state, said plurality of switches connected to said first bias voltage, said plurality of switches connected to said second bias voltage, a disable signal being produced when at least one of said plurality of switches is in said closed state;

a quantity selector for setting a specified quantity of safety mats;

a comparator connected to said quantity selector and said plurality of safety mats, said comparator producing a status signal responsive to said specified quantity of safety mats differing from an actual quantity of safety mats; and an activation module operatively coupled between said first and second bias voltages, said activation module operative to produce an output switching signal responsive to at least one of said disable signal and status signal, said output switching signal disabling power to a machine.

12. The control system of claim 11, wherein the disable signal alters said first and second bias voltages.

13. The control system of claim 11, further comprising:
a redundant comparator connected to said quantity selector and said plurality of safety mats, said redundant quantity comparator producing a redundant status signal responsive to said specified quantity of safety mats differing from said actual quantity of safety mats; and a redundant activation module, said redundant activation module operative to produce a redundant output switching signal responsive to at least one of said disable signal and redundant status signal.

14. The control system of claim 11, wherein said closed state corresponds to application of a threshold pressure to at least one of said plurality of safety mats, and wherein said open state corresponds to an absence of application of said threshold pressure.

15. The control system of claim 11, wherein said activation module includes an optical coupler.

16. The control system of claim 11, wherein said quantity selector comprises a variable impedance selector for setting a total specified impedance, wherein said plurality of safety mats includes a total mat impedance composed of a plurality of individual mat impedance values corresponding to each of the plurality of safety mats.

17. The control system of claim 16, further comprising a plurality of connection mechanisms associated with said plurality of safety mats, wherein the plurality of individual mat impedance values are integrated within said plurality of connection mechanisms.

18. The control system of claim 17, wherein said quantity comparator is a window comparator having as inputs a first input voltage, a second input voltage, and a third input voltage, said first input voltage corresponding to said actual quantity of safety mats, said second input voltage and said third input voltage defining a voltage window corresponding to said specified quantity of safety mats, said first, second, and third input voltage received by said quantity comparator through an impedance bridge including as impedance bridge legs said total mat impedance and said total specified impedance.

19. In a safety system utilizing a plurality of pressure-sensitive safety mats connected in series, a control system comprising, in combination:

means for detecting application of a threshold pressure to a pressure-sensing region within said plurality of pressure-sensitive safety mats;

means for detecting a lack of electrical connectivity between adjacent safety mats within said plurality of pressure-sensitive safety mats;

means for detecting whether an actual mat quantity is in nonconformance to a specified mat quantity; and means for disabling a machine upon detecting at least one of:
said application of said threshold pressure to said pressure-sensing region,
said lack of electrical connectivity between adjacent safety mats, and
said actual mat quantity is in nonconformance to said specified mat quantity.

20. The control system of claim 19, wherein said means for detecting whether said actual mat quantity is in conformance with said specified mat quantity includes means for making an impedance comparison.

21. A control system for use in a machine-guarding application comprising, in combination:

a plurality of pressure-sensitive safety mats connected in series, each safety mat comprising a first laterally-disposed conductive plate and a second laterally-disposed conductive plate, said first laterally-disposed conductive plate electrically isolated from said second laterally-disposed conductive plate when a threshold pressure has not been applied to said first laterally-disposed conductive plate or said second laterally-disposed conductive plate, said first laterally-disposed conductive plate electrically coupled to first laterally-disposed conductive plates of adjacent safety mats, said second laterally-disposed conductive plate electrically coupled to second laterally-disposed conductive plates of adjacent safety mats, said plurality of safety mats having a total mat impedance composed of a plurality of individual mat impedance values;

a quantity selector for setting a total specified impedance, said total specified impedance corresponding to a specified quantity of safety mats in said machine-guarding application;

a first window comparator having as inputs a first input voltage, a second input voltage, and a third input voltage, said first input voltage corresponding to an actual quantity of safety mats, said second input voltage and said third input voltage defining a voltage window corresponding to said specified quantity of safety mats, said first input voltage, said second input voltage, and said third input voltage received by said first-window comparator through an impedance bridge including as impedance bridge legs said total mat impedance and said total specified impedance, said first window comparator producing a first status signal responsive to said first input voltage being outside said voltage window;

a first activation module having a first optical coupler connected in series between a first node and a second node, said first node connected to a first bias voltage through said first laterally-disposed conductive plates of said plurality of safety mats, said second node connected to a second bias voltage, said first optical coupler propagating a first disable signal responsive to a first threshold current flowing between said first node and said second node said first activation module producing a first output switching signal responsive to said first disable signal and said first status signal.

22. The control system of claim 21, further comprising:
a second window comparator; and
a second activation module having a second optical coupler.

* * * * *